(12) United States Patent
Graber

(10) Patent No.: US 7,530,424 B1
(45) Date of Patent: May 12, 2009

(54) SONIC BOOM SIMULATOR

(76) Inventor: Curtis E. Graber, 9301 Roberts Rd., Woodburn, IN (US) 46797

( * ) Notice: Subject to any disclaimer, the term of this patent is extended or adjusted under 35 U.S.C. 154(b) by 222 days.

(21) Appl. No.: 11/286,486

(22) Filed: Nov. 23, 2005

(51) Int. Cl.
*G10K 11/18* (2006.01)
*G01M 7/08* (2006.01)
*G10K 11/00* (2006.01)
*G01M 7/00* (2006.01)

(52) U.S. Cl. .................. 181/0.5; 181/151; 181/139; 73/571; 73/865.6

(58) Field of Classification Search .............. 381/94.1, 381/186, 335, 342, 352, 357, 71.1, 71.2, 381/71.5, 71.7, 353, 354; D14/260; 181/184, 181/199, 151, 30, 139, 142, 0.5; 244/1 N, 244/114 B; 73/571, 586, 587, 865.6; 367/13
See application file for complete search history.

(56) References Cited

U.S. PATENT DOCUMENTS

| | | | | |
|---|---|---|---|---|
| 3,113,271 A * | 12/1963 | Buckley | ................... | 455/63.1 |
| 3,442,115 A * | 5/1969 | Slutsky et al. | .............. | 73/12.08 |
| 3,912,866 A * | 10/1975 | Fox | ............................. | 381/352 |
| 4,138,594 A * | 2/1979 | Klipsch | ...................... | 381/335 |
| 4,218,683 A * | 8/1980 | Hemming | ................... | 343/703 |
| 4,357,499 A * | 11/1982 | Bruel | ........................... | 73/571 |
| 4,477,505 A * | 10/1984 | Warnaka | ..................... | 428/160 |
| 4,507,660 A * | 3/1985 | Hemming | ...................... | 342/1 |
| 4,619,342 A * | 10/1986 | Buck | ........................... | 181/184 |
| 4,845,759 A * | 7/1989 | Danley | ........................ | 381/97 |
| 5,210,383 A * | 5/1993 | Noxon | ........................ | 181/290 |
| 5,444,198 A * | 8/1995 | Gallas | ........................ | 181/295 |
| 5,854,848 A * | 12/1998 | Tate et al. | .................... | 381/357 |
| 5,975,238 A * | 11/1999 | Fuchs et al. | ................. | 181/295 |
| 6,009,184 A * | 12/1999 | Tate et al. | .................... | 381/357 |
| 6,073,722 A * | 6/2000 | Babuke et al. | ................ | 181/30 |
| 6,082,490 A * | 7/2000 | Rowland | ..................... | 181/295 |
| 6,118,883 A * | 9/2000 | Rocha | ......................... | 381/387 |
| 6,155,116 A * | 12/2000 | Muench et al. | .............. | 73/599 |
| 6,285,772 B1 * | 9/2001 | Tate et al. | .................... | 381/357 |
| 6,295,032 B1 * | 9/2001 | Podgorski | ................... | 343/703 |
| 6,343,134 B1 * | 1/2002 | Czerwinski | ................. | 381/342 |
| D454,344 S * | 3/2002 | Tate et al. | ................... | D14/260 |
| 6,356,643 B2 * | 3/2002 | Yamagishi et al. | ......... | 381/349 |
| 6,396,932 B1 * | 5/2002 | Tate et al. | .................. | 381/94.1 |
| 6,411,718 B1 * | 6/2002 | Danley et al. | ............... | 381/342 |

OTHER PUBLICATIONS

Leatherwood et al., A New Simulator for Assessing Subjective Effects of Sonic Booms, Sep. 1991, NASA TM 104150.

* cited by examiner

*Primary Examiner*—Edgardo San Martin
(74) *Attorney, Agent, or Firm*—Paul W. O'Malley; Susan L. Firestone

(57) ABSTRACT

A supersonic boom simulator constructed from a directed coherent sound pulse source, a waveguide and a bass trap at the opposite end of the waveguide from the directed coherent sound pulse source.

12 Claims, 6 Drawing Sheets

SONIC BOOM SIMULATOR

BACKGROUND OF THE INVENTION

1. Technical Field

The invention relates to a simulator for generating realistic simulations of acoustic signatures for sounds, particularly sonic booms, as perceived by a person on the ground.

2. Description of the Problem

The sonic boom generated by an aircraft flying at supersonic speeds has proven a major impediment in enhancing air travel. With the de minimus exception of the Concorde, and the briefly proposed Boeing "Sonic Cruiser", essentially all increases in air speed in civil aviation occurred between 1903 and the introduction in the early 1960's of the Convair 990. For over forty years there has been little increase in the cruising speed of civil airliners and business aircraft.

The sonic boom undermined much of the economics of supersonic travel. Sonic booms proved damaging and annoying, which resulted in supersonic flight over land areas being banned. With supersonic flight limited to overwater flights, the market for such aircraft was both limited, and aircraft developed for such operations could not be economically redirected to overland use where their supersonic capabilities were of little use.

Eliminating the ill effects of the sonic boom would be facilitated by better understanding of the effects of sonic booms. Some of those effects are perceptual, that is, sonic booms are undesirable over populated areas simply because people do not like them. To better study perceptual issues a realistic sonic boom simulator is necessary.

The National Aeronautics and Space Administration has long recognized the need for sonic boom research and has built the Sonic Boom Simulator at the Langley Research Center in Hampton, Va. The Langley Sonic Boom Simulator is a person-rated, airtight, loudspeaker driven booth capable of accurately reproducing user-specified sonic boom waveforms at peak sound pressure levels up to approximately 138 dB. Input waveforms are distorted to compensate for nonuniformities in the frequency response characteristics of the booth and sound reproduction system.

The small size, and air tight features of the Langley facility underlie some of that facility's limitations. The facility takes a very direct approach in attempting to reproduce the sound of a sonic boom. The chamber is air tight and has rigid walls to support the low frequencies present in a sonic boom (i.e. to contain the slow pressure rise portion of the boom). However, most people experience a sonic boom under near free field conditions, which a small air tight chamber cannot replicate. NASA viewed sonic boom simulators as having inherently non-uniform frequency responses due to enclosure of the air space. The answer was to use complex computer algorithms to adjust components of the sound spectrum.

SUMMARY OF THE INVENTION

According to the invention a sonic boom simulator includes a directed acoustic broad band coherent pulse source, a bass trap open to and spaced from the directed acoustic broad band coherent pulse source, and a wave guide connecting the directed acoustic broad band coherent pulse source which admits a subject. The entire arrangement is road transportable.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
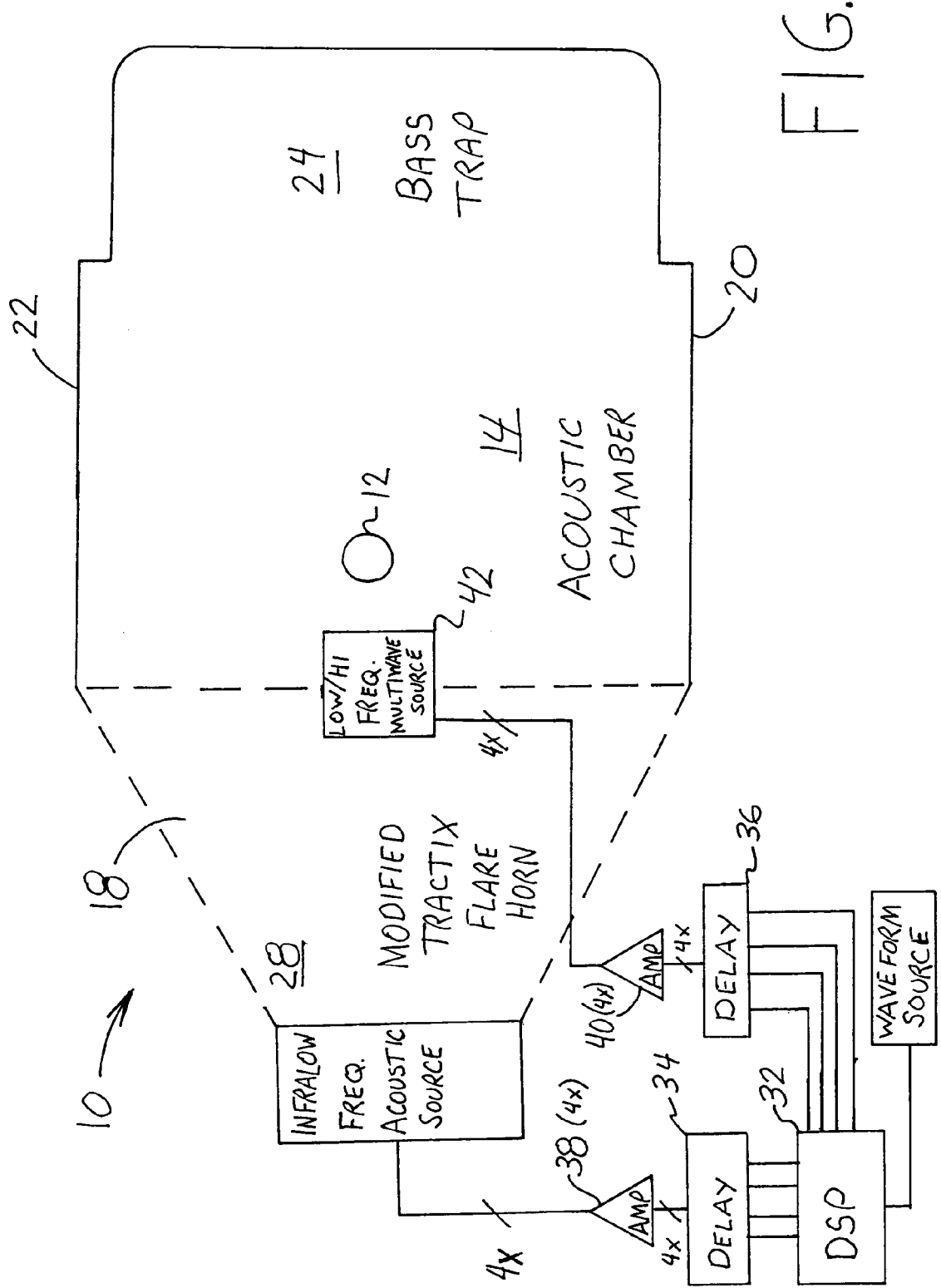
FIG. 1 is a schematic view of the sonic boom simulator according to a preferred embodiment of the invention.

Referring now to FIG. 1, a sonic boom or acoustic event simulator 10 is illustrated schematically. Acoustic event simulator 10 produces a realistic simulation of a sonic boom for a human subject 12 located inside an acoustic chamber 14. Acoustic chamber 14 is defined by a mouth 16 from a horn 18, side walls 20, 22, a floor and a ceiling (not shown) and a bass trap 24 opposite horn mouth 16. Acoustic chamber 14 can be viewed as a wave guide between mouth 16 and bass trap 24. Side walls 20, 22, the floor and the ceiling are lined with sound attenuating material. Acoustic chamber 14 is a near free field environment and may be considered semi-anechoic based on its reverberation times (shown in FIG. 6). A perception of directionality of sound, including such reverberation as occurs is preserved. Details of the side wall construction (which also apply to floors and ceilings) are described below.

Sound energy is introduced to acoustic chamber 14 from two sources. One source is an infra to low frequency loudspeaker system (IF acoustic source 26), which is located at the throat 28 of the flare horn 28. While flare horn 18 is preferably a modified tractix flare, other flare configurations (e.g. hyperbolic) may be used. IF acoustic source 26 is preferably a cascaded linear array of subwoofers such as described in copending patent application Ser. No. 10/649,040, filed 27 Aug. 2003 (and published as United States Patent Application 2005/0047622). Application Ser. No. 10/649,040 is expressly incorporated herein in its entirety. This system provides high acoustic energy conversion in a small footprint package preserving portability. The second acoustic source is a low to high frequency multi-wave high coherent source (indicated as MF acoustic source 42) and is exemplified by the ST/STX series of loudspeaker arrays manufactured by Renkus-Heinz, Inc., 19201 Cook Street, Foothill Ranch, Calif. The low to high frequency source 42 is located in the mouth 16 of the flare horn 18 and is oriented to direct sound out into the acoustic chamber 14.

Juxtaposed from the mouth 16 across the acoustic chamber 14 is a bass trap 24, the details of the construction of which are illustrated below. Bass trap 24 functions as an energy trap and dampening element important in providing a near, but not perfect, free field audio environment of acoustic chamber 14. The audio environment most closely resembles an outdoor environment, with a single boundary layer and minimal obstructions.

All transducers require a wave form input and accordingly a waveform source 30 is provided. Conventionally, the waveform for simulating a sonic boom should include components to reproduce the characteristic N-wave representing alternating compression and expansion of air where a shock wave intersects the ground. Subject 12 is typically positioned seated forward from the mouth 16, about a foot from audio source 42, with his back to the mouth. Obviously the subject's distance to each transducer, requiring timing of the application of the wave form to each transducer to be varied to account for the expected distance of the transducer from the subject. The response time characteristics of the transducer at the frequencies applied to the transducer also vary. Acoustic chamber 14 retains just enough reverberation, which differs by frequency (see FIG. 6), to produce a realistic ring down from the simulated boom, reflecting the fact that a ground based observer is not in a pure free field environment. No ring down waveform is required from waveform source 30.

Allocation of the frequency spectrum for a sonic boom waveform and application of the appropriate delay to each channel is conventionally handled by a programmed digital signal processor 32 and delay lines 34, 36. Pre-amplification is provided to the signals by amplifiers 38, 40. It may be noted that the IF acoustic source 26 operates to sum outputs from four transducers which are staged along a horn and different delays apply to each transducer to generate a coherent pulse upon summing. Otherwise, little modification of an input sonic boom waveform is required to accommodate the listening space.

Figure 2:
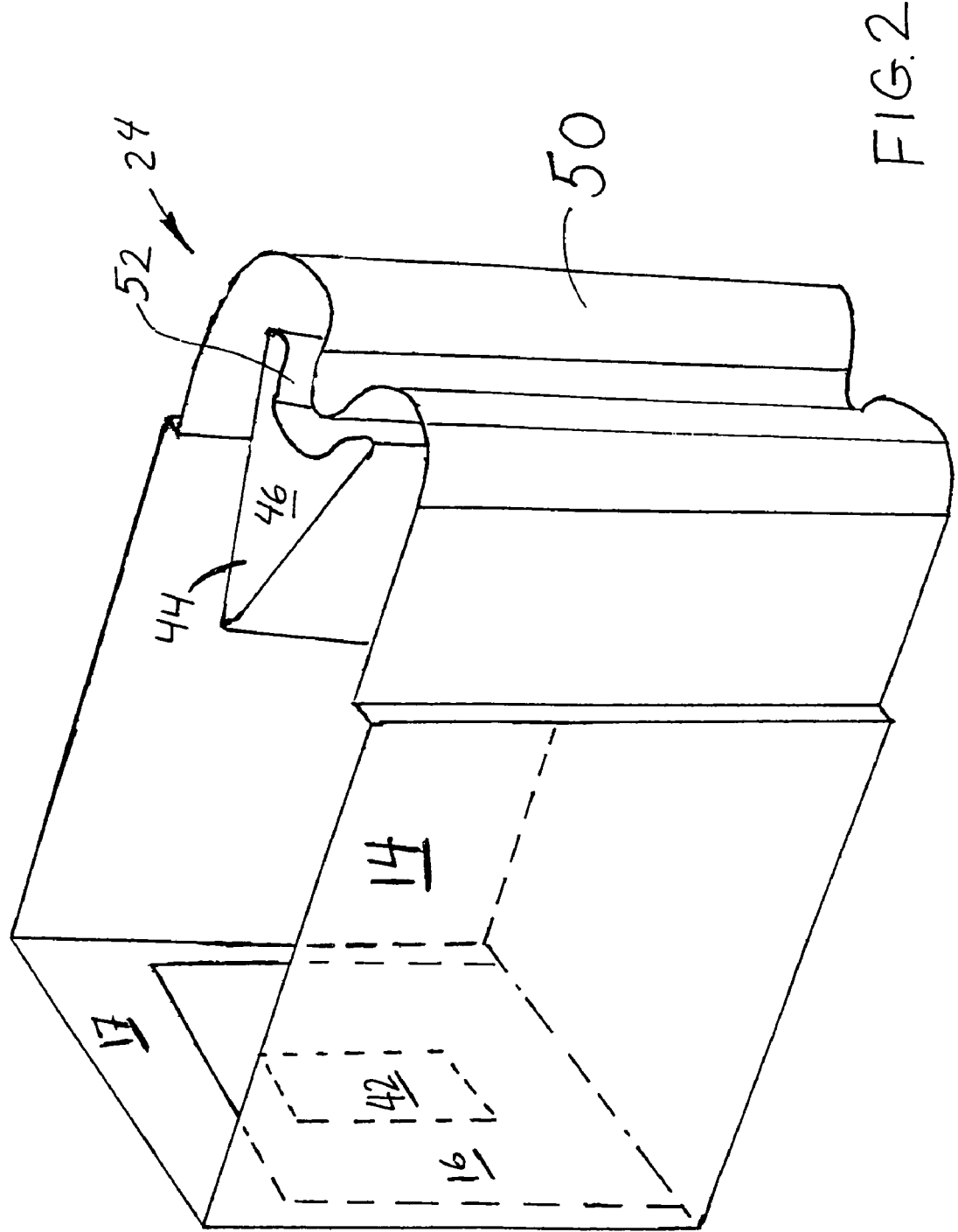
FIG. 2 is a perspective view of the sonic boom simulator acoustic chamber.

Referring to FIG. 2, some details of the configuration of acoustic chamber 14 and bass trap 24 are illustrated. Along a forward wall 17 from acoustic chamber 14 are depicted the outlines of the mouth 16 of horn 18 and of the face of MF acoustic source 42. Both horn 18 and MF acoustic source 42 direct sound directly into bass trap 24. Bass trap 24 itself comprises a serpentine path 48 defined between a multi-curved back wall 50 and a wedge 44. The serpentine path 48 focuses sound energy into the back of wedge 44, which is filled with a sound dampening material 46. Thus bass trap 24 functions to deaden sound. Wedge 44 is oriented to present a pointed end toward the sound sources, and to flair outwardly side to side in the direction of the back wall 50. A back face 52 of the wedge 44 may conform to the contour of the back wall 50.

It is not conclusively known if the shape of the serpentine path 48 and configuration of wedge 48 are the only ones which will function effectively as a bass trap 48. What is known from empirical evaluation is that a configuration which produces a substantially even distribution of sound energy throughout the acoustic chamber 14 and in the bass trap 24 is the most effective.

Figure 3:
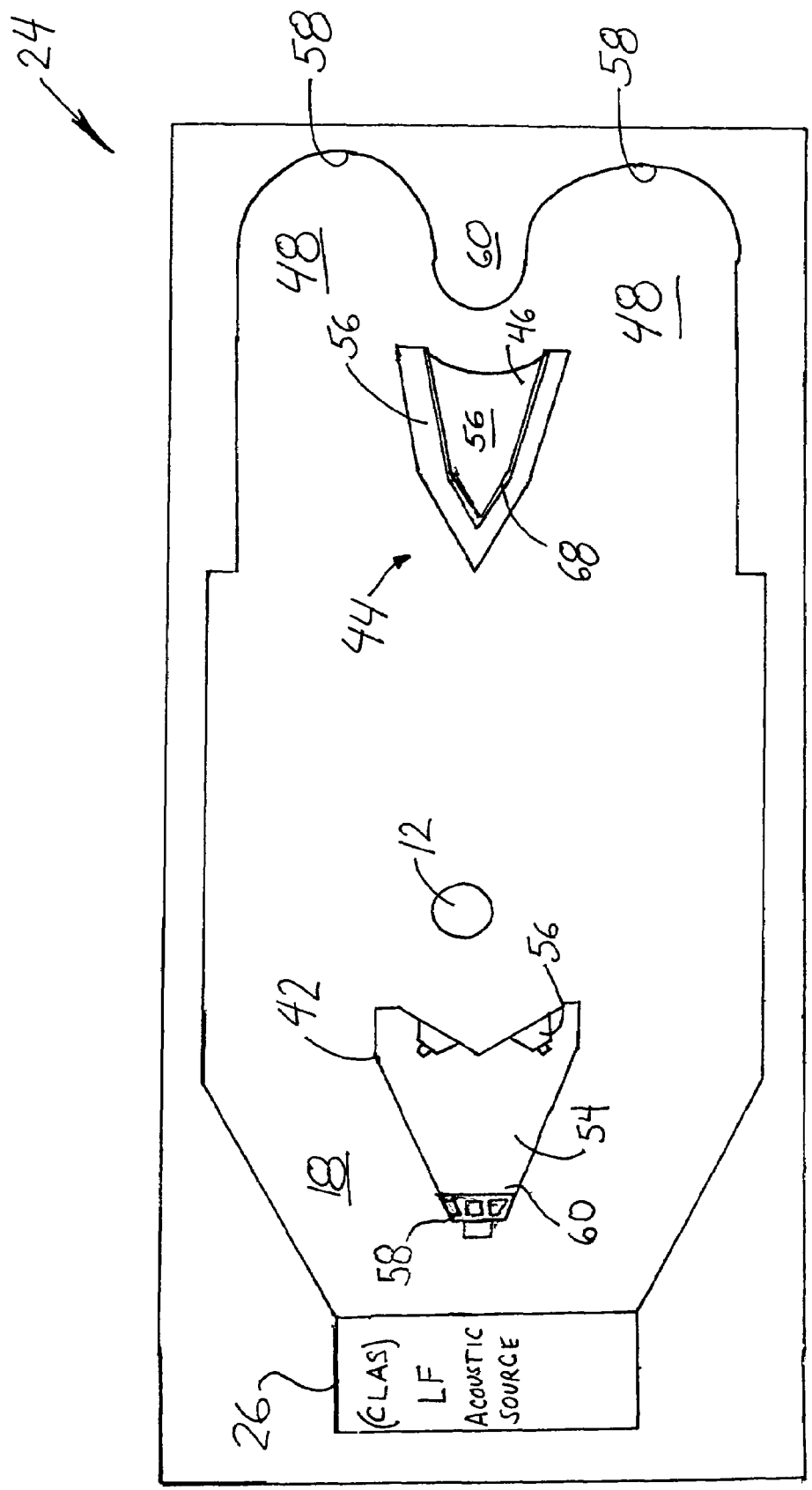
FIG. 3 is a cross sectional view of the acoustic chamber of FIG. 2.
Figure 4:
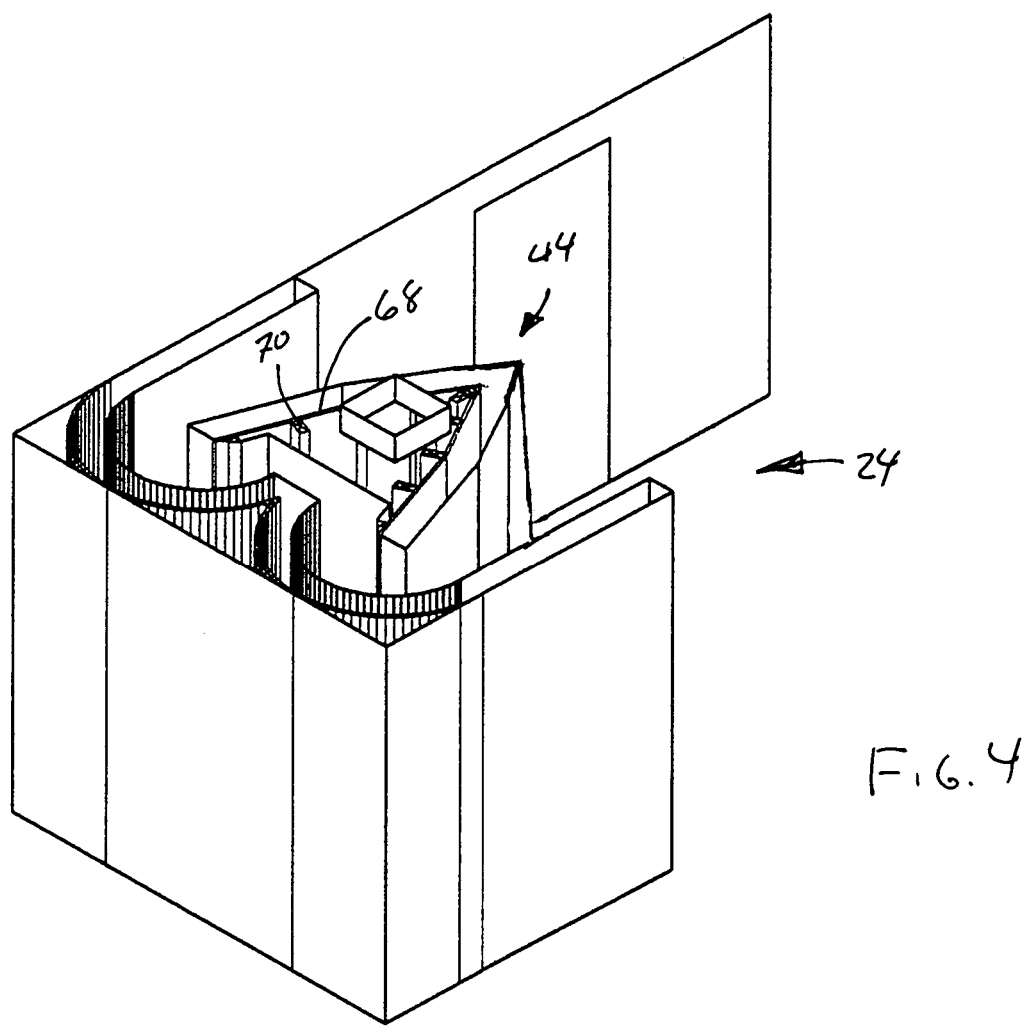
FIG. 4 is a partial perspective of a bass trap particularly illustrating construction details of the bass trap.

Referring to FIG. 3, additional details of sonic boom simulator 10 are shown in a cross sectional view. MF acoustic source includes a plurality of transducers 56, 58, covering a broad frequency range. The lower frequency transducer 58 is located at the throat 60 of a horn 54. Higher frequency transducers 56 are disposed in partial opposition above and below (not shown) the mouth of horn 54. Wedge 44 sits forward from wall 50, which defines two half cylinders 58 and a central column 60, which is centered behind wedge 44. The half cylinders 58 focus sound energy into the triangular section 56, which operates as do cones in an anechoic room to cancel sound waves through interference. Wedge 44 is built on plywood walls 68, the exterior faces of which are covered with a sound deadening layer 56. The interior gap 56 is advantageously filled with a sound deadening material 46. FIG. 4 shows more detail of one embodiment of the bass trap 24. Wall 68 may be supported internally by braces 70, if necessary. The entire sonic boom simulator 10 may be housed within a towable trailer 100.

Figure 5:
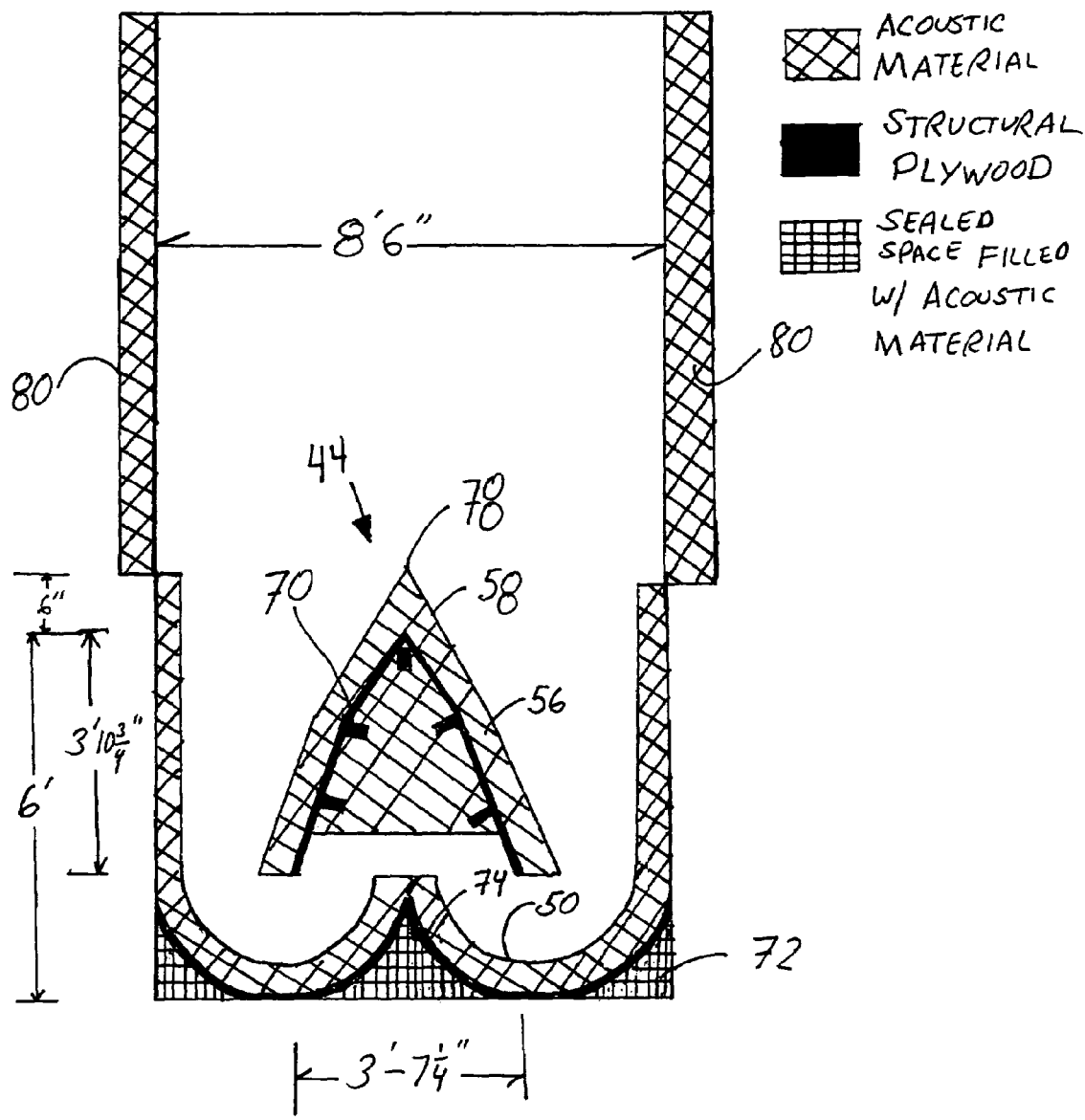
FIG. 5 is a cross section of the bass trap.

FIG. 5 illustrates detail of the construction of the acoustic chamber 14 and bass trap 24. The acoustic chamber 14 has a nearly square cross section, side to side and top to bottom, of 8 and one half feet. Its length is not critical, but should comfortably admit a human subject. The walls, as well as the roof and floor of the acoustic chamber 14 are made of an acoustic material, limiting reflection, but primarily to contain sound energy. Z-beam stringers 80 may be used as supports between inner and outer walls which define the sides of the acoustic chamber 14. The opening to bass trap 24 is defined by a slightly narrowed side to side width as against the acoustic chamber 14. Wedge 44 has its apex 78 oriented into the acoustic chamber 14 and the wedge widens toward the back wall 50. Back wall 50, with supporting wall 74, are constructed basically on two half cylinders as already described. Two layers of acoustic material are provided, the rear most layer being in a sealed space. Wedge 44 comprises two plywood walls 58, which give the wedge its characteristic shape, and which define a sound killing trap. The shape and dimensions of acoustic chamber 14 are chosen to produce wave guide transmission characteristics which deliver the maximum energy into the trap and to retain the sound energy there. Ray trace modeling was done as an empirical basis for adjusting wedge 44 configuration. Any change to acoustic chamber 14 or change in position of the sound sources, could require reoptimization of wedge 44. Acoustic material advantageously fills the gap between the plywood walls. The bass trap 24 is about seven feet in depth, with the wedge 44 extending from a point centered in the opening of the bass trap onto the acoustic chamber 14 about four feet into the trap. Wedge 44 extends from top to bottom of the opening, exhibits the same horizontal cross sectional shape from top to bottom and expands to a width of about four feet at its deepest point in the bass trap 44.

Figure 6:
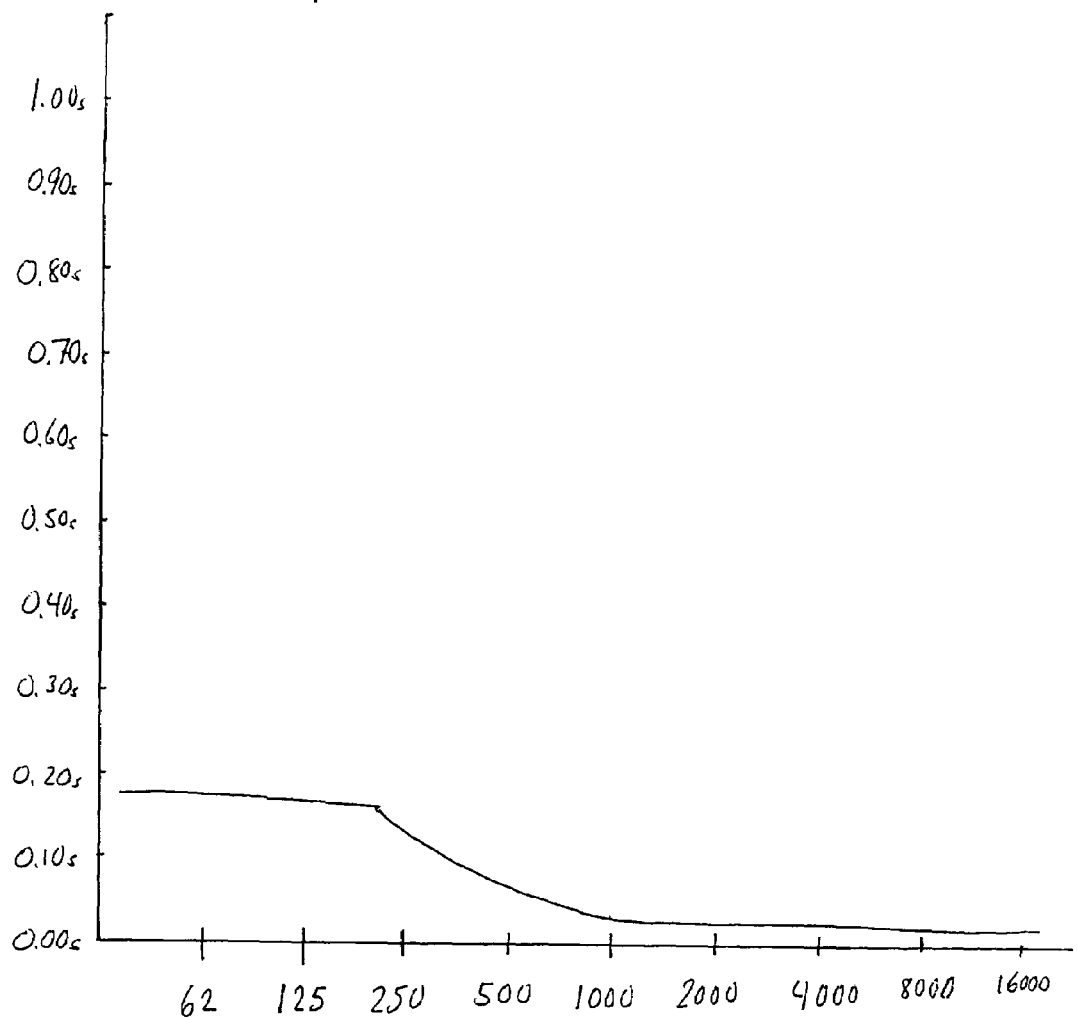
FIG. 6 is a graph of reverberation time in the acoustic chamber of FIG. 2.

In FIG. 6 it may be seen that reverberation time in the acoustic chamber 14 is essentially level at 0.16 seconds from 100 Hz to 250 Hz, after which it tapers off parabolically to a lower limit of about 0.04 seconds for higher frequencies.

The invention provides a realistic sounding simulation of a sonic boom, which, advantageously, is constructed of light weight materials allowing the entire facility to be fitted to a trailer.

While the invention is shown in only one of its forms, it is not thus limited but is susceptible to various changes and modifications without departing from the spirit and scope of the invention.

What is claimed is:

1. An acoustic event simulator, comprising:
   an acoustic waveguide having first and second ends and exhibiting a substantially constant cross-sectional profile along its length;
   an infra to low frequency sound source;
   a horn for coupling sound emitted from the infra to low frequency sound source into one end of the acoustic waveguide, the horn having a mouth substantially corresponding to the cross sectional profile of the waveguide;
   a low to high frequency coherent sound source located in the mouth of the horn;
   a bass trap terminating the acoustic waveguide at an end of the acoustic waveguide opposite the mouth for dampening low frequency sound in the acoustic waveguide while allowing reverberation of higher frequency sound produced by the sound sources to emulate a free field environment; and the dimensions of the acoustic waveguide admitting a test subject at a location in front of the mouth where sound fronts propagating across the test subject from the infra to low and low to high frequency sound sources are substantially coherent.

2. An acoustic event simulator as claimed in claim 1, the bass trap further comprising:

a rear wall comprising first and second half cylinders open toward the mouth; and an upright wedge structure forward from the rear wall with an apex facing the mouth and a base facing the first and second half cylinders.

3. An acoustic event simulator as claimed in claim 2, the bass trap further comprising:

the upright wedge structure defining an interior triangular focus forward from the rear wall; and sound deadening material substantially filling the interior triangular focus.

4. An acoustic event simulator as claimed in claim 1, further comprising:

an N-wave emulation signal source coupled to the infra to low frequency sound source and to the low to high frequency coherent sound source.

5. An acoustic event simulator as claimed in claim 3, further comprising:

an N-wave emulation signal source coupled to the infra to low frequency sound source and to the low to high frequency coherent sound source.

6. An acoustic event simulator as claimed in claim 5, further comprising:

opposed sides connecting the bass trap and the mouth of the horn, the opposed sides including sound dampening acoustic material.

7. Apparatus comprising:

an acoustic shock wave emulation source; and a bass trap open to and spaced from the acoustic shock wave emulation source for dampening infra and low frequency components of an emulated acoustic shock wave;

a wave guide having a substantially constant cross-sectional profile and sized to admit a test subject, the wave guide being connected between the shock wave emulation source and the bass trap; and a horn for directing infra and low frequency components of an emulated acoustic shock wave generated by the acoustic shock wave emulation source into the waveguide in a substantially coherent front.

8. Apparatus as set forth in claim 7, the shock wave emulation source further comprising:

a cascaded array of transducers for producing infralow to low frequency sound components of an emulated acoustic shock wave;

the horn connecting the infralow to low frequency cascaded array of transducers to the wave guide; and a low to high frequency audio pulse source located in a mouth of the horn.

9. Apparatus as set forth in claim 8, further comprising:

the bass trap providing an even distribution of infralow sound energy through the bass trap and the wave guide during generation of an emulated acoustic shock wave.

10. Apparatus as set forth in claim 8, further comprising:

the bass trap comprising a column wedge with a narrow end oriented toward the shock wave emulation source and an interior sound cancelling apex.

11. Apparatus as set forth in claim 10, further comprising:

the bass trap including an acoustic guide and focusing element behind the column wedge for directing sound energy into the column wedge.

12. Apparatus as set forth in claim 11, further comprising:

a trailer housing the infralow to low frequency cascaded linear array of transducers, the low to high frequency array of transducers, the wave guide and the bass trap.

* * * * *